G. H. CHINNOCK.
PNEUMATIC TIRE SHOE AND METHOD OF MAKING SAME.
APPLICATION FILED MAR. 9, 1917.
1,254,884.
Patented Jan. 29, 1918.
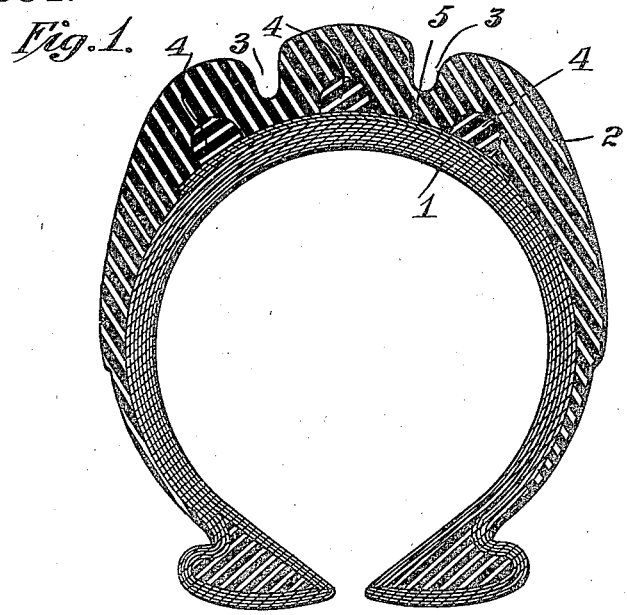
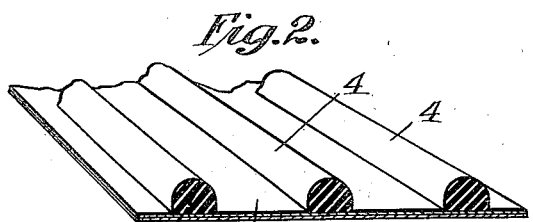
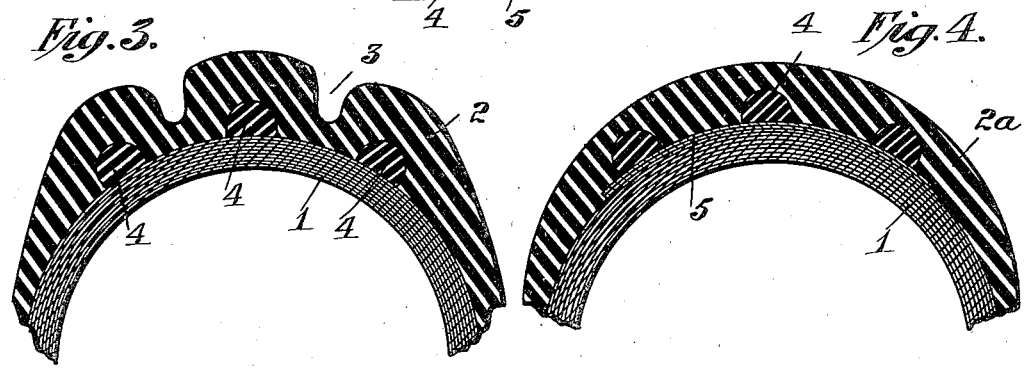
WITNESSES:
INVENTOR.
George H. Chinnock
BY
ATTORNEYS

UNITED STATES PATENT OFFICE.

GEORGE H. CHINNOCK, OF BROOKLYN, NEW YORK.

PNEUMATIC-TIRE SHOE AND METHOD OF MAKING SAME.

1,254,884.     Specification of Letters Patent.     Patented Jan. 29, 1918.

Application filed March 9, 1917. Serial No. 153,573.

*To all whom it may concern:*

Be it known that I, GEORGE H. CHINNOCK, a citizen of the United States of America, and a resident of the borough of Brooklyn, county of Kings, city and State of New York, have invented certain new and useful Pneumatic-Tire Shoes and Methods of Making Same, of which the following is a specification.

My invention relates to shoes for pneumatic tires and the like, and the methods of making the same; and as an article of manufacture comprises a pneumatic tire shoe which, by reason of its construction, is more resilient than shoes of ordinary construction, other things being equal; the said shoe comprising one or more cores of a soft and very resilient material, such as nearly pure rubber, embedded in the tread rubber of the shoe. As a process or method my invention comprises steps whereby such soft rubber core or cores is or are located within the tread portion of the shoe.

The objects of my invention are to produce a tire of great durability and of great resilience and flexibility, which, at the same time, may be manufactured readily and without undue expense.

I will now proceed to describe my invention with reference to the accompanying drawing, in which:

Figure 1 shows a transverse section of one form of tire shoe embodying my invention; Fig. 2 is a fragmentary perspective elevation of a plurality of elastic cores mounted upon a retaining strip; Fig. 3 is a fragmentary transverse section of a shoe showing the soft rubber cores mounted directly upon the carcass; and Fig. 4 is a fragmentary section of the shoe having the said soft rubber cores, but having a plain tread instead of the corrugated tread shown in Figs. 1 and 3.

The tread rubber of the shoe of a pneumatic tire must necessarily be somewhat hard and tough in order that the tread may have the desired wearing qualities, but being somewhat hard and tough, it does not, in and of itself, yield materially to minor roughnesses of the roadway, except as the entire section of the tire (that is to say, the carcass, inner tube, etc.,) yields at the point of impact on such roughnesses of the roadway. If hollow spaces were provided within the tread portion of the shoe, this tread portion could yield of itself to roughnesses in the roadway; and thereby a very thick tread could be provided, and yet the shoe would be easy riding, because of yielding of the tread of itself to roughnesses, independent of, or in connection with, yielding of the shoe as a whole. But conditions of manufacture make it very difficult to provide holes in the tread itself.

I have found, however, that one or more cores of very soft and yielding material, (such, for example, as rubber consisting of about 90 per cent. pure gum), may be embedded in the tread portion of the shoe; and owing to the great elasticity and relative softness of such soft rubber cores, the tread rubber of the shoe is enabled to yield, very much as if it were provided with cushion holes; and to yield independent of, though usually in connection with, yielding of the shoe as a whole; and thereby the shoe is made much more easy riding than would otherwise be the case.

Referring first to Fig. 1: numeral 1 designates the carcass of the tire which may be of any usual construction, and numeral 2 the tread rubber or rubber composition, which may be of any composition generally considered suitable for tread rubber. In Figs. 1 and 2 I have shown the tread provided with deep corrugations 3; a construction which is desirable since it tends toward easy riding, and also tends to prevent skidding; but this is not an essential feature of my invention, since, as shown in Fig. 4, the tire may have a plain tread; in which Fig. 2ª designates the tread rubber of the tire.

4—4 designate soft and yielding cores embedded in the tread rubber, and preferably located between that tread rubber and the carcass. Without limiting myself to any particular material for these cores, I will state that I prefer to make them of a composition comprising about 90 per cent. pure gum, with such other ingredients as may be necessary or desirable for vulcanizing and other purposes. These soft rubber cores are applied to the carcass before the tread rubber is applied thereto, and before so applying said cores it is convenient to first cement them on a strip 5, consisting of one or more layers of rubber impregnated fabric, and then to wrap this fabric about the carcass, circumferentially; in which case the strip 5 forms, in effect, the usual breaker strip. However, the use of this strip 5 is not necessary, and as shown in Fig. 3, the cores 4 are laid directly upon the carcass 1. In the Fig. 4 construction it is immaterial whether the cushion members 4 are applied by means of a strip 5, as there shown, or are laid directly upon the carcass.

The material of the cushion members 4 may, if necessary, be partly vulcanized before application to the carcass (whether or not the strip 5 be used), and its composition should be of such nature that the material of such strips 4 shall be vulcanized to the proper final degree when the material of the tread 2 has been vulcanized as usual.

In constructing the shoe, the carcass 1 is first constructed in the ordinary manner; then the cushion members 4 are applied, if necessary, in a partly vulcanized condition, as before stated, either by means of a strip 5 or by laying these cushion members 4 directly on the carcass. The tread rubber 2 is then applied in the usual manner, and the shoe placed within the usual molds and vulcanized or cured in the usual manner. As is well known, this vulcanization or curing of the tread rubber involves the subjection of the shoe to considerable pressure, and frequently there is considerable flowing of the tread rubber in the molds, as an incident to this pressure; but the adhesion of the cushion strips 4 to the strip 5 (if that strip be used) or to the carcass itself, (if the strips 4 be applied to the carcass) serves to hold these strips 4 in place. To insure such adhesion, such strips 4 are preferably cemented firmly to the strip 5 or to the carcass itself, before the application of the tread rubber. When the tread is provided with deep corrugations, as shown in Figs. 1 and 3, it is preferable that each of the cores 4 shall be located at about the center of one of the ribs of the corrugated tread.

What I claim is:

1. A pneumatic tire shoe comprising a carcass and layer of tread rubber and one or more cores located between the tread rubber and carcass and embedded in recesses of the tread rubber and composed of rubber of a softer and more yielding nature than the tread rubber itself.

2. A tire shoe comprising an annularly ribbed tread having embedded in it one or more cores of a resilient material which is more soft than the rubber of the tread itself, each such core located about midway of one of the ribs of such tread.

3. A pneumatic tire shoe comprising a carcass, a flexible strip having thereon one or more cores, and a layer of tread rubber, such strip provided with one or more cores located between the tread rubber and the carcass, and the said cores being embedded in recesses of the tread rubber and being composed of rubber of a softer and more yielding nature than the tread rubber itself, the several parts of the shoe being united by vulcanization.

4. The herein described method of making pneumatic tire shoes which comprises applying to a tire carcass a strip of flexible material having cemented thereon one or more soft rubber, unvulcanized or partly vulcanized, cores, applying tread rubber to the carcass, and over and around such core or cores, and then vulcanizing the said tread rubber, and in so doing completing the vulcanization of the rubber of the core or cores.

In testimony whereof I have signed this specification in the presence of two subscribing witnesses.

GEORGE H. CHINNOCK.

Witnesses:
H. M. MARBLE,
B. J. LEVINE.